United States Patent
Laxman et al.

(10) Patent No.: US 8,364,617 B2
(45) Date of Patent: Jan. 29, 2013

(54) RESILIENT CLASSIFICATION OF DATA

(75) Inventors: Srivatsan Laxman, Bangalore (IN); Ramarathnam Venkatesan, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 606 days.

(21) Appl. No.: 11/625,249

(22) Filed: Jan. 19, 2007

(65) Prior Publication Data

US 2008/0177680 A1    Jul. 24, 2008

(51) Int. Cl.
    *G06E 1/00*     (2006.01)
    *G06F 15/18*     (2006.01)

(52) U.S. Cl. .............. 706/20; 706/19; 706/45

(58) Field of Classification Search ............ None
See application file for complete search history.

(56) References Cited

U.S. PATENT DOCUMENTS

| | | | |
|---|---|---|---|
| 5,870,735 A | 2/1999 | Agrawal et al. | |
| 6,134,344 A | 10/2000 | Burges | |
| 6,161,130 A | 12/2000 | Horvitz et al. | |
| 6,192,360 B1 | 2/2001 | Dumais et al. | |
| 6,278,962 B1 | 8/2001 | Klimasauskas et al. | |
| 6,327,581 B1 | 12/2001 | Platt | |
| 6,427,141 B1 | 7/2002 | Barnhill | |
| 6,553,365 B1 | 4/2003 | Summerlin et al. | |
| 6,728,690 B1 | 4/2004 | Meek et al. | |
| 2002/0184169 A1 | 12/2002 | Opitz | |
| 2004/0015462 A1 | 1/2004 | Lienhart et al. | |
| 2004/0177110 A1 | 9/2004 | Rounthwaite et al. | |
| 2005/0049990 A1* | 3/2005 | Milenova et al. ......... | 706/48 |
| 2005/0131847 A1* | 6/2005 | Weston et al. ............ | 706/12 |
| 2005/0209785 A1* | 9/2005 | Wells et al. ............. | 702/19 |
| 2005/0216426 A1* | 9/2005 | Weston et al. ............ | 706/12 |
| 2006/0074828 A1* | 4/2006 | Heumann et al. ......... | 706/20 |
| 2006/0112095 A1 | 5/2006 | Xie et al. | |
| 2006/0287848 A1* | 12/2006 | Li et al. .................. | 704/9 |
| 2008/0126280 A1 | 5/2008 | Liu et al. | |
| 2008/0177684 A1 | 7/2008 | Laxman et al. | |

OTHER PUBLICATIONS

Kuncheva et al., L., "Measures of Diversity in Classifier Ensembles and Their Relationship with the Ensemble Accuracy", 2003.*
Chen et al., T., "A New Binary Classifier: Clustering-Launched Classification", ICIC 2006, pp. 278-283, 2006.*
Barreno, Marco et al., "Can Machine Learning Be Secure,?" Proceedings of the ACM Symposium on Information, Computer and Communication Security, ASIACCS'06, Mar. 21-24, 2006, Taipei, Taiwan, © 2006 ACM.
Burges, Christopher J.C., "A Tutorial on Support Vector Machines for Pattern Recognition," Data Mining and Knowledge Discovery, 2, 121-167, 1998, © 1998 Kluwer Academic Publishers, Boston.
Drucker, Harris et al., "Support Vector Machines for Spam Categorization," IEEE Transactions on Neural Networks, vol. 10, No. 5, Sep. 1999, © 1999 IEEE, pp. 1048-1054.
U.S. Appl. No. 11/464,761, filed Aug. 15, 2006, Liu et al.

(Continued)

*Primary Examiner* — Jeffrey A Gaffin
*Assistant Examiner* — Adrian Kennedy
(74) *Attorney, Agent, or Firm* — Perkins Coie LLP

(57) ABSTRACT

A classification system is described for resilient classification of data. In various embodiments, the classification system divides a full set of the training data into a positive subset and a negative subset. The positive subset contains all training data with a positive classification value and the negative subset contains all training data with a negative classification value. The classification system constructs several subsets of the training data wherein each subset contains data randomly selected from both the positive subset and the negative subset. The classification system then creates at least two classifiers based on each of the randomly created subsets of the training data.

17 Claims, 8 Drawing Sheets

OTHER PUBLICATIONS

U.S. Appl. No. 11/625,266, filed Jan. 19, 2007, Laxman et al.

Lowd, Daniel and Christopher Meek, "Good Word Attacks on Statistical Spam Filters," CEAS 2005, http://www.ceas.cc/papers-2005/125.pdf, [last accessed Dec. 27, 2007].

Yao, Yuan et al., "Fingerprint Classification with Combinations of Support Vector Machines," *Proc. Third Int'l Conf. Audio- and Video-Based Biometric Person Authentication*, pp. 253-258, 2001.

Krogh, Anders and Jasper Vedelsby, "Neural Network Ensembles, Cross Validation, and Active Learning," Advances in Neural Information Processing Systems 7, MIT Press, Cambridge, MA, 1995, 8 pages.

Hearst, Marti A., "Support vector machines," Trends & Controversies, IEEE Intelligent Systems, Jul./Aug. 1998, pp. 18-28.

Clark, John W. and Haochen Li, "Application of Support Vector Machines to Global Prediction of Nuclear Properties," International Journal of Modern Physics B, © World Scientific Publishing Company, Mar. 12, 2006, 15 pages.

* cited by examiner

RESILIENT CLASSIFICATION OF DATA

CROSS-REFERENCE TO RELATED APPLICATION(S)

This patent application is related to copending patent application Ser. No. 11/625,266, entitled "COMBINING RESILIENT CLASSIFIERS" and filed concurrently herewith.

BACKGROUND

Classifiers such as support vector machines (SVMs) can be employed for classification and regression of data sets. Classifiers are employed in many areas, including search, pattern recognition, regression estimation, "SPAM" detection, intrusion detection, and other security-related applications. An SVM operates by finding a hyper-surface in a space of possible inputs by analyzing training data. The hyper-surface attempts to split "positive" examples in the space of possible inputs from "negative" examples by maximizing the distance between the nearest of the positive and negative examples to the hyper-surface. This allows for correct classification of data that is similar, but not identical, to the training data.

Various techniques can be employed to train an SVM. Most commonly, a large portion of the training data is used to train the SVM, following which the remaining small portion of the training data is used to test the SVM's accuracy. This process is repeated until the test results in a satisfactory accuracy.

The training data can contain errors. For example, a provider of training data may maliciously or inadvertently provide training data that contains errors. A malicious entity that knows that a set of training data will be employed to train an SVM can purposely introduce errors in the training data so that, for example, a SPAM-detection component employing the resulting SVM classifies SPAM that the malicious entity later sends as not being SPAM. As an example, the malicious entity may be able to indicate that all electronic mail messages coming from an identified domain and containing a specified subject line are not SPAM. The behavior of the malicious entity may be difficult to understand and may not follow a well-defined model. This problem can be exacerbated when the training data comes from multiple sources, with some being potentially unreliable. As an example, a provider of anti-SPAM software may employ as training data electronic mail messages from several sources, with each such message identified as being SPAM or not SPAM. If one or more sources identify a large number of messages incorrectly, the resulting SVM could incorrectly classify messages it later receives. It is possible for a malicious source to alter a small subset of the training data to sufficiently alter the hyper-surface and thereby render it unusable.

Errors in the training data may not occur according to any known model. Thus, errors may be said to be correlated. Whether or not a data point is in error may depend on not just the data point itself, but on other data points as well. Alternatively, there may be no explicit malicious entity and consequently no explicit attack on the training data, in which case the errors may be said to be uncorrelated. In either case, the classification performance can significantly suffer because of the errors in the training data.

SUMMARY

A classification system is described for resilient classification of data. The classification system can create multiple classifiers, such as SVMs, based on small subsets of training data, with one classifier for each such subset of data. The subsets of data may be randomly selected from a large set of training data that is classified as positive or negative. The data for each subset may be randomly selected. Each subset with randomly selected data can have significantly less data than the total set of training data, such as one percent or less of the data in the entire training data set. The classification system then constructs a classifier for each of the small subsets it creates. To classify non-training data, each classifier classifies the non-training data as positive or negative. The classification system selects the final classification of the received non-training data by combining the result from each classifier. Alternatively, the classification system provides a single combined classifier that is based on the multiple created classifiers.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1A:
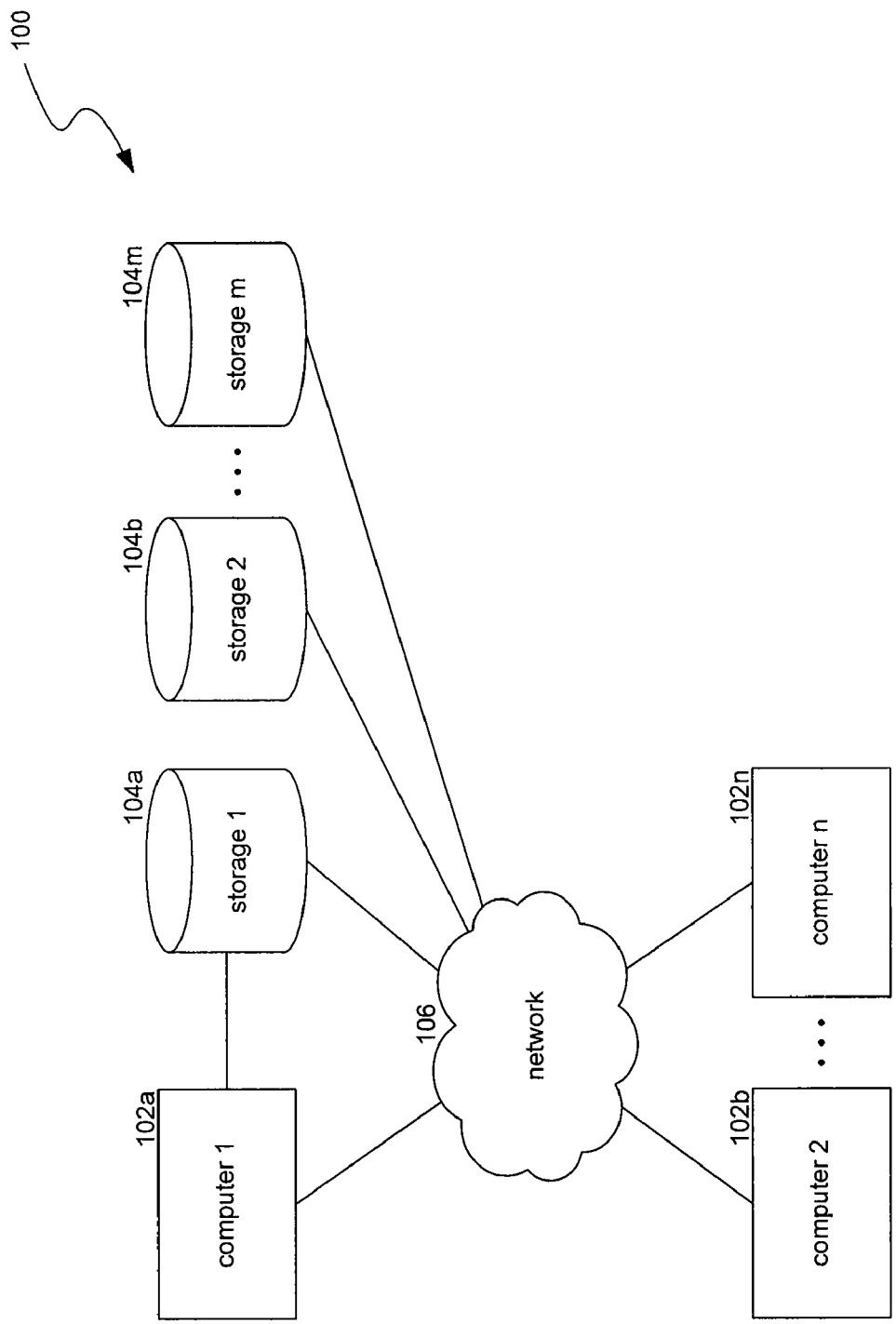
FIGS. 1A-1B are block diagrams illustrating components associated with the classification system in various embodiments.

A classification system is described for resilient classification of data. In some embodiments, the classification system creates multiple classifiers, such as SVMs, based on small, randomly selected subsets of training data, with one classifier for each such subset of data. The subsets of data may be randomly selected from a large set of training data that has already been classified as positive or negative. As an example, the set of training data may include several thousand electronic mail messages, with each message indicated as SPAM (positive value) or not SPAM (negative value). The data for each subset may be randomly selected with equal distribution from the positive and negative data and, from within the subsets containing positive or negative data, with uniform distribution. Thus, each subset should have approximately an equal number of SPAM and not-SPAM messages. This random selection can be performed without replacement, meaning that the same data cannot appear more than once in a subset. Each subset with randomly selected data can have significantly less data than the total set of training data, such as one percent or less of the data in the entire training data set. As an example, the training data set can have ten thousand messages, but each subset may have one hundred messages. The classification system can then construct an SVM for each of the small subsets it creates. To classify non-training data, the classification system causes each SVM to classify the non-training data as positive or negative. The classification system then selects the final classification of the received non-training data by combining the results from each SVM. When an SVM classifies data as positive or negative, it indicates on which side of its corresponding hyper-surface the data lies. For example, an electronic mail message whose combined classification is positive may be characterized as SPAM. Examples of ways to combine SVMs are to use a simple majority vote, a weighted majority vote, parallelization, or to create a combination SVM. Each of these ways of combining the results of SVMs will be discussed after discussing the notations used in this patent application.

The full training data set is identified as follows:

$$D=\{(x_i,y_i):(x_i,y_i)\in \Re^m \times \{+1,-1\}, i=1, \ldots l\}$$

This training data set comprises l members, and each member of the training data set, $(x_i,y_i)$, has an input of features, x, that is classified, y, as positive (e.g., +1) or negative (e.g., −1). Various features can be employed to construct an SVM that, together, are termed a feature space. As an example, when classifying electronic mail messages, the feature space may include the sender's identification, subject line, time, contents, recipients, and so forth. The output of the SVM is used to classify the input features, and can be specified as follows:

$$f(x) = \sum_{i=1}^{l} \alpha_i y_i K(x_i, x) + b$$

In the sum, $\alpha_i$ represents weights, known as Lagrange multipliers ("multipliers"), with one multiplier associated with each of the l members ("data points"). These weights are obtained through an SVM learning procedure. $K(x_i,x)$ is a kernel function that calculates inner products in the feature space. Various kernel functions can be employed, such as linear, Gaussian, or Chi-squared kernel functions. The SVM function also employs a bias, b, that is computed as follows:

$$b = y_k - \sum_{i=1}^{l} \alpha_i \alpha_k y_i y_k K(x_i, x_k)$$

Bias is calculated for some k such that $0<\alpha_k<C$ where C is a misclassification penalty that is greater than or equal to zero.

The classification system can create SVMs after creating multiple smaller subsets of data from the full training data set. The classification system initially divides the training data set into two subsets, each containing the positive or negative values. Define $D_+=\{(x_i,y_i)\in D:y_i=+1\}$ and $D_-=\{(x_i,y_i)\in D: y_i=-1\}$ as the two subsets containing the positive or negative values. The classification system creates J small subsets by randomly selecting m values from each of these two subsets. In some embodiments, the classification system selects the values randomly from each subset with equal probability. If R(j) is a randomly created subset, then $R(j) \subset D$, j=1, . . . J. Each such subset can be of size m where m is much less than l (e.g., in some embodiments, m is one percent or smaller of l). An SVM is constructed based on each R(j). Thus, the classification system can create J SVMs.

The classification of an input x is the sign of an SVM's output, as stated by the function $f(x)$. As an example, when an input (e.g., set of features) is computed by the SVM to be a positive number, it is classified as positive. Conversely, when the input is computed to be a negative number, it is classified as negative. When the input is computed to be zero, it lies on the hyper-surface and so can be classified as either positive or negative, depending on how restrictive the classification needs to be. As an example, inputs computed by the SVM function to be on the hyper-surface (e.g., zero) may be classified as SPAM in addition to inputs that are computed to be positive.

The classification system can combine SVMs or their outputs in various ways. In some embodiments, the classification system employs a simple majority vote in which each created SVM provides a temporary classification for new data that is not part of the training data set and the classification system selects the statistical median classification. In some embodiments, the classification system can compute a simple majority vote, the output of which is represented as $\bar{g}(\bullet)$, as follows:

$$\bar{g}(x) = \psi\left(\sum_{j=1}^{J} \psi(f^{(j)}(x))\right)$$

In this equation, $\psi(f(x))=+1$ when $f(x)\geq 0$ and $\psi(f(x))=-1$ when $f(x)<0$.

In some embodiments, the classification system selects the statistical mean classification instead of the statistical median. However, empirical evidence suggests that the median may be a better indicator for classification.

In some embodiments, the classification system employs a weighted majority vote in which each created SVM has a specified weight associated with it. In these embodiments, the classification system applies a classification for an input based on the weighted majority vote of the result of each SVM. The weights can be assigned in various ways. In various embodiments, the classification system employs as a weight for an SVM the margin of the SVM, the absolute value of the result of the SVM, etc. The margin of an SVM is a measure of how well the SVM performs and is defined as the overall separation between the positive and negative classifications the SVM emits. The greater the margin, the better the SVM performs. The classification system can compute the combined output using the weighted majority vote as follows:

$$\hat{g}(x) = \psi\left(\sum_{j=1}^{J} \theta_j f^{(j)}(x)\right)$$

where $\hat{g}(x)$ represents the output of the weighted majority vote, $\theta_j |f^{(j)}(x)|$ represents the weight applied to the $j^{th}$ SVM, and $\theta_j$ is a confidence factor for this SVM.

The classification system can compute the confidence factor, $\theta_j$, for each of the J SVMs by mapping the SVM outputs to a sigmoid function. The parameters of the sigmoid can be obtained using Maximum Likelihood Estimation, as described in J. Platt, *Probabilistic Outputs for Support Vector Machines and Comparisons With Regularized Likelihood Methods*, in A. Smola et al., editors, *Advances In Large Margin Classifiers*, MIT Press, 2000. Such a sigmoid enables the classification system to calibrate the output of an SVM in terms of posterior probabilities, which in turn enables computation of an empirical Bayes error rate. The $\theta_j$ is fixed as one minus this estimated Bayes error rate of the $j^{th}$ SVM.

The weighted majority vote method enables parallelization because each SVM with randomly selected data can be combined in a distributed manner. The Lagrange multipliers for each SVM are defined only for data points in the training set of that SVM and for no other data points. That is, for the $j^{th}$ SVM, $\alpha_i^{(j)}$ are defined by the SVM for all $i\in R(j)$. Then, the classification system can set $\alpha_i^{(j)}=0$ for all $i \notin R(j)$ and construct a combining classifier by computing the weighted average of the Lagrange multiplier values by computing $\hat{\alpha}_i$ for $i=1, \ldots, l$ and $\hat{b}$, the bias, as follows:

$$\hat{\alpha}_i = \frac{1}{J}\sum_{j=1}^{J} \theta_j \alpha_i^{(j)}, i = 1, \ldots, l; \text{ and}$$

$$\hat{b} = \frac{1}{J}\sum_{j=1}^{J} \theta_j b^{(j)}$$

The final combined SVM can be computed as follows:

$$\hat{g}(x) = \psi\left(\sum_{i=1}^{l} \hat{\alpha}_i y_i K(x_i, x) + \hat{b}\right)$$

Another way to combine the SVMs is to construct an SVM based on the other SVMs, such as by (1) employing the support vectors from each of the other SVMs as a training data set or (2) employing the full training data set with the majority voting classifications using either the simple majority vote or the weighted majority vote.

Figure 1B:
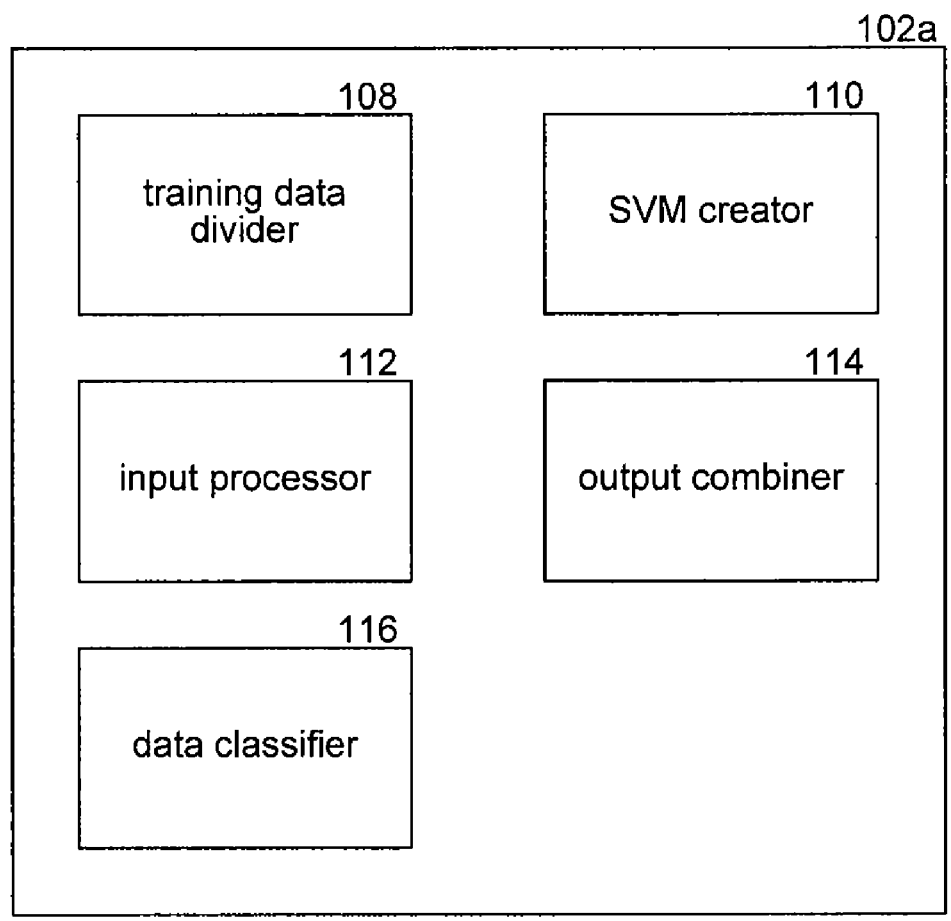

Several embodiments of the classification system will now be described in more detail with reference to the Figures. FIGS. 1A-1B are block diagrams illustrating components associated with the classification system in various embodiments. Referring to FIG. 1A, a classification system 100 can include one or more computing devices, such as computer 1 102a, computer 2 102b, and computer n 102n. The classification system can also include one or more storage devices, such as storage 1 104a, storage 2 104b, and storage m 104m. In various embodiments, the storage devices can be connected as separate devices to computing devices or can be a portion of a computing device. The storage devices can store training data, inputs, classifications, and other information, such as in a database. The computing devices and storage devices that are not a portion of computing devices can be interconnected via a network 106, such as an intranet or the Internet.

The computing devices on which the classification system operates may include one or more central processing units, memory, input devices (e.g., keyboard and pointing devices), output devices (e.g., display devices), storage devices (e.g., disk drives), and network devices (e.g., network interfaces). The memory and storage devices are computer-readable media that may store instructions that implement the classification system. In addition, the data structures and message structures may be stored or transmitted via a data transmission medium, such as a signal on a communications link. Various communications links may be used, such as the Internet, a local area network, a wide area network, or a point-to-point dial-up connection.

The classification system may use various computing systems or devices including personal computers, server computers, hand-held or laptop devices, multiprocessor systems, microprocessor-based systems, programmable consumer electronics, network PCs, minicomputers, mainframe computers, distributed computing environments that include any of the above systems or devices, and the like. The classification system may also provide its services to various computing systems, such as personal computers, cell phones, personal digital assistants, consumer electronics, home automation devices, and so on.

The classification system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Referring to FIG. 1B, a computing device, such as computer 1 102a of FIG. 1A, can include various components associated with the classification system. These components include a training data divider 108, an SVM creator 110, an input processor 112, an output combiner 114, and a data classifier 116.

The training data divider can divide a set of training data into subsets. As an example, the training data divider can divide the training data into a positive subset containing training data classified as positive and a negative subset containing training data classified as negative. The training data divider can also create multiple small subsets of training data, such as subsets of data that is randomly selected from the positive and negative subsets with equal distribution. In various embodiments, the training data divider may provide an interface that receives indications of the types or numbers of subsets into which it should divide the training data.

The SVM creator can construct one or more SVMs, such as by employing the subsets of training data the training data divider creates. The SVM creator can also construct combined SVMs, such as by combining Lagrange multipliers associated with the SVMs that are to be combined. In some embodiments, the SVM creator can construct combined SVMs in parallel, e.g., when creating the multiple SVMs.

The input processor receives and processes input, such as data that is to be classified. Upon receiving the input, the input processor can employ (1) one or more SVMs to create a classification, (2) the output combiner to combine temporary classifications provided by the multiple SVMs, and (3) the data classifier to emit or store a classification for the input.

The output combiner receives temporary classifications (e.g., outputs) provided by multiple SVMs in response to a provided input and employs one or more methods to combine the temporary classifications to produce a classification for the input. As examples, the output combiner can employ a simple majority vote or a weighted majority vote to produce the classification for the input.

The data classifier can emit or store classifications of input. As an example, the data classifier may store the classification of an input in a database. In some embodiments, the data classifier may employ the output combiner to combine the outputs of multiple SVMs before classifying input.

Figure 2:
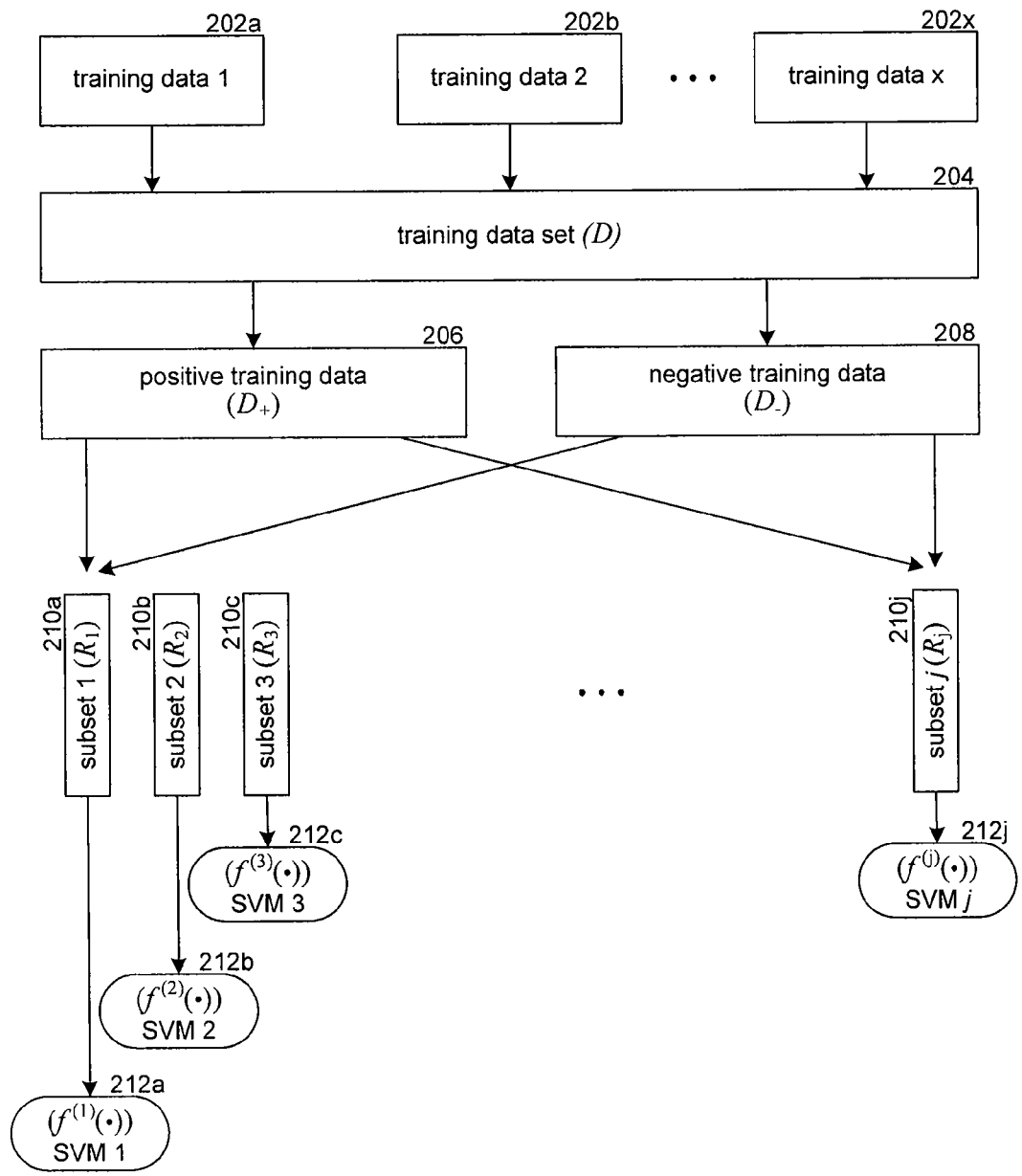
FIG. 2 is a data flow diagram illustrating how training data can be employed to construct support vector machines in various embodiments.

FIG. 2 is a data flow diagram illustrating how training data can be employed to construct support vector machines in various embodiments. The classification system can retrieve or receive one or more sets of training data from multiple sources of data, such as training data 1 202a, training data 2 202b, and training data x 202x. These sets of training data can provide inputs and classifications for the inputs. As an example, these sets of training data can provide electronic mail messages and classifications of whether these messages are SPAM or not SPAM. Some of this training data can contain errors that are either maliciously or inadvertently introduced. As examples, a user of an Internet electronic mail service provider may have inadvertently classified some electronic messages as SPAM or a malicious attacker of an electronic mail system may have maliciously classified electronic messages as not SPAM in an attempt to enable the attacker to send messages in the future that will not be filtered by a SPAM filter.

The classification system combines the training data that it retrieves or receives into a full training data set 204.

A component of the classification system, such as the training data divider 108, can divide the full training data set into a positive training data set 206 and a negative training data set 208. This component can also create one or more subsets of the training data by selecting, e.g., without replacement, elements from the positive training data and the negative training data to create subsets of training data from which SVMs can be created. The subsets can be created by randomly selecting elements from the positive and negative training data with equal probability. These subsets are illustrated in FIG. 2 as a subset 1 210a, subset 2 210b, subset 3 210c, and subset j 210j. Each subset may contain a much smaller number of data elements from the full training data set. As an example, each subset may contain one percent of the number of elements in the full training data set. In various embodiments, the component may employ some or all of the full set of training data to create the multiple small subsets.

A component of the classification system, such as the SVM creator 110, can construct one or more SVMs based on the created subsets of training data. In some embodiments, the component may employ each subset of training data to create a corresponding SVM. As an example, the component employs subset 1 to create SVM 1, subset 2 to create SVM 2, and so forth. These SVMs are illustrated in FIG. 2 as SVM 1 212a, SVM 2 212b, SVM 3 212c, and SVM j 212j. Each SVM has a corresponding function that takes one or more features as input and produces a classification as an output.

Figure 3A:
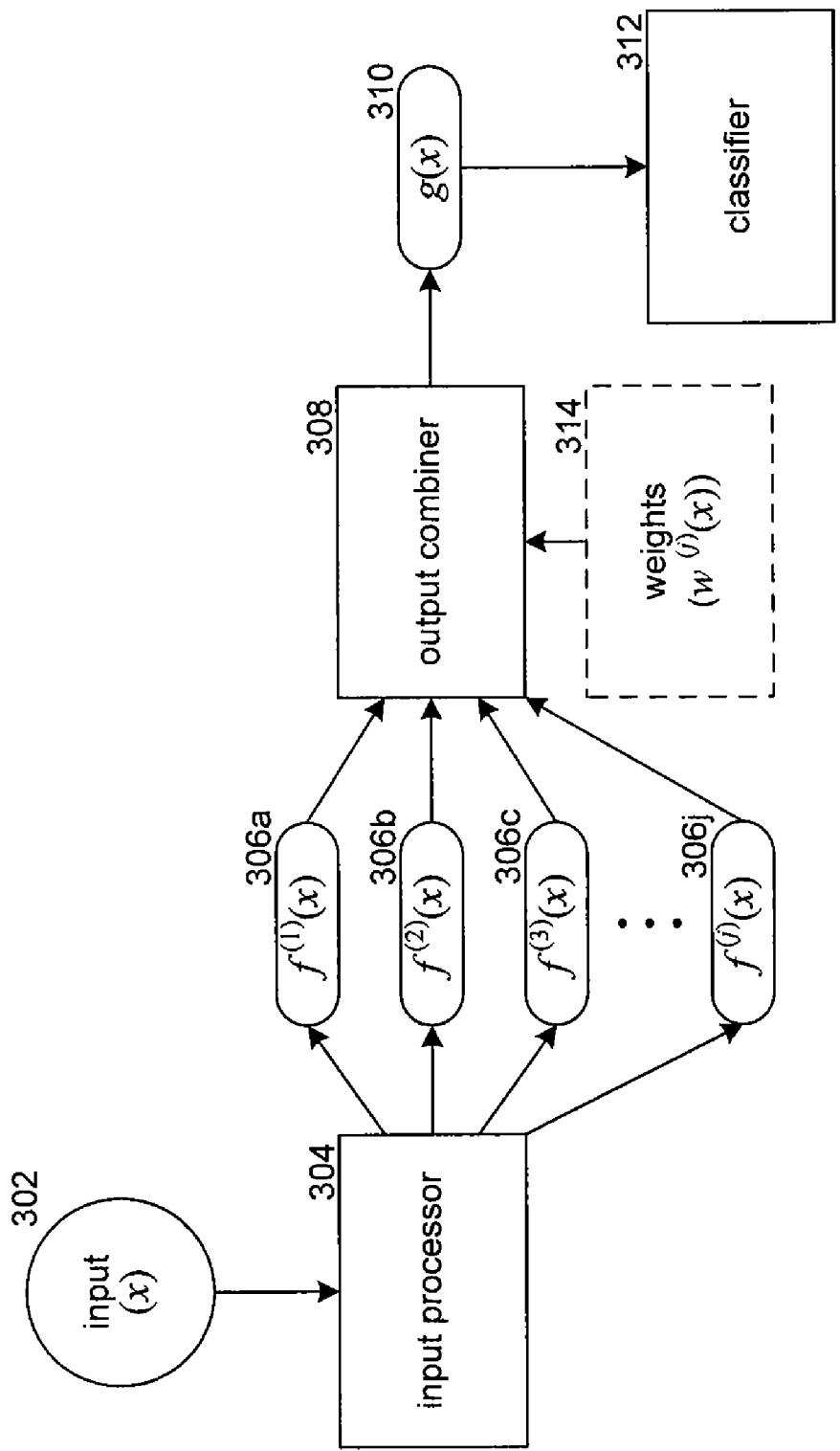
FIGS. 3A-3B are data flow diagrams illustrating classification of data in various embodiments.
Figure 3B:
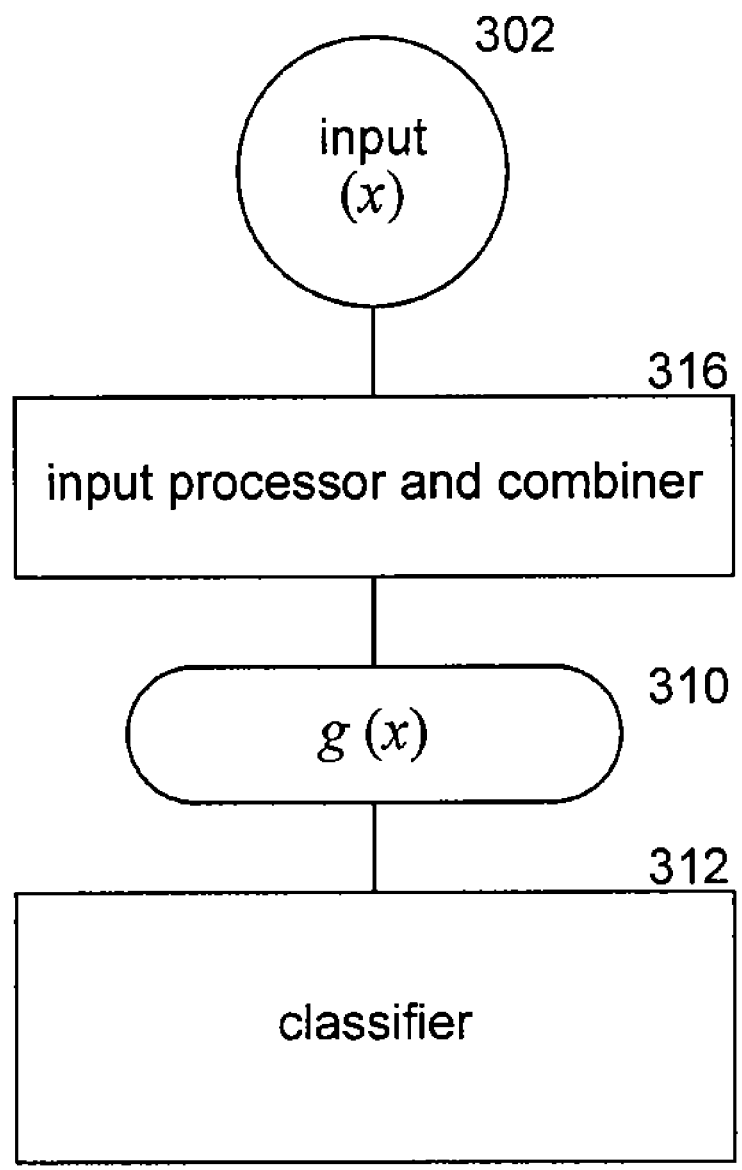

FIG. 3A-3B are data flow diagrams illustrating classification of data in various embodiments. According to the embodiment illustrated in FIG. 3A, the classification system receives an input 302 at input processor 304. The input can be any type of data for which the classification system has constructed SVMs to process. As an example, the classification system may receive an electronic mail message as input.

The input processor employs the previously created SVMs (e.g., SVM 1 306a, SVM 2 306b, SVM 3 306c, . . . SVM j 306j) to create temporary classifications for the received input.

The classification system then employs an output combiner 308 to combine the inputs to produce an output, e.g., a combined classification 310. The output combiner can employ various methods to combine the temporary classifications, such as a simple majority vote, a weighted majority vote, and so forth. In some embodiments, when employing the weighted majority vote method, the output combiner may employ weights 314. These weights may be computed using various methods, such as an SVM margin, one minus a fraction of points in the SVM's training set, an absolute value of the SVM's decision function at the input's data point, and so forth.

The classification system may then employ a classifier 312 to emit or store the combined classification 310, such as in a database.

According to the embodiment illustrated in FIG. 3B, the classification system receives an input 302 at an input processor and combiner component 316. As an example, the classification system may employ component 316 when SVMs have been combined, such as in parallel when constructing the SVMs, into a combined SVM that provides a combined classification 310. The classifier component 312 may then emit or store the combined classification 310, such as in a database.

Figure 4:
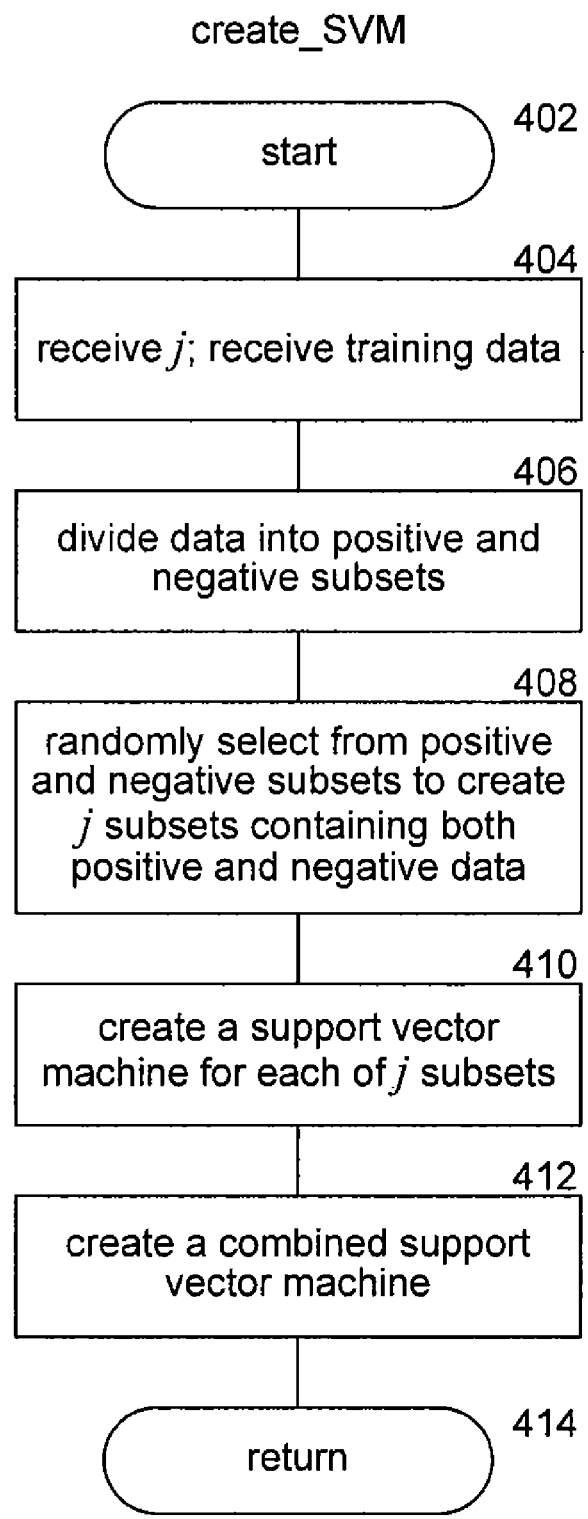
FIG. 4 is a flow diagram illustrating a create_SVM routine invoked by the classification system in some embodiments.

FIG. 4 is a flow diagram illustrating a create_SVM routine invoked by the classification system in some embodiments. The classification system may invoke the create_SVM routine to construct an SVM based on a small subset of training data that is randomly selected from a full set of training data. The routine begins at block 402. At block 404, the routine receives as parameters a number of SVMs to create, j, and a full set of training data. At block 406, the routine divides the training data into two subsets containing elements with positive or negative classifications. At block 408, the routine randomly selects elements from the subsets containing elements classified as positive or negative to create j subsets containing elements with both positive and negative classifications. In some embodiments, the routine selects these elements from the subsets containing elements classified as positive or negative with equal probability. At block 410, the routine creates a support vector machine for each of the j subsets. Thus, the routine can create j SVMs. In some embodiments, the routine may not employ all the training data in the full set of training data or may create more or fewer than j subsets. At block 412, the routine can create a combined SVM. As an example, the routine can create an SVM based on the Lagrange multipliers used to construct the j SVMs or by constructing an SVM based on classifications of training data re-classified by each of the multiple SVMs. At block 414, the routine returns.

Those skilled in the art will appreciate that the logic illustrated in FIG. 4 and described above, and in each of the flow diagrams discussed below, may be altered in a variety of ways. For example, the order of the logic may be rearranged, substeps may be performed in parallel, illustrated logic may be omitted, other logic may be included, etc.

Figure 5:
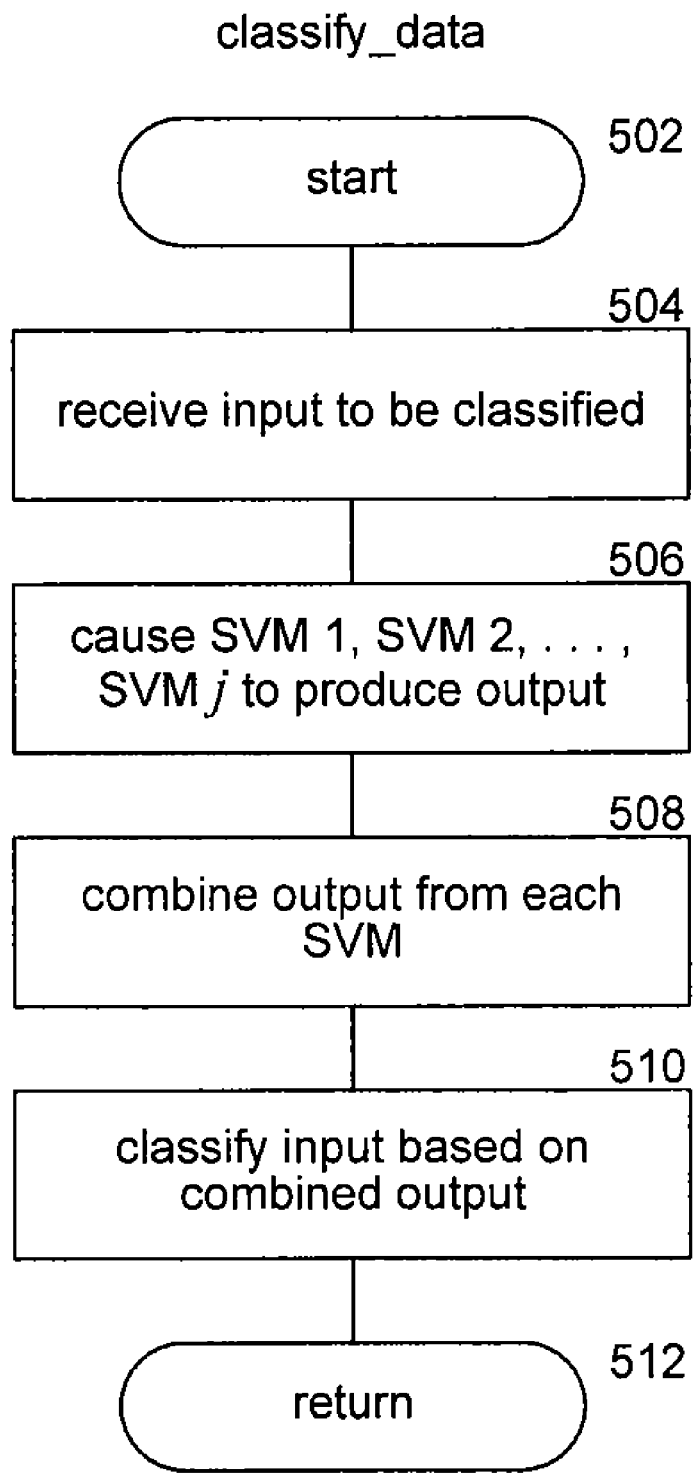
FIG. 5 is a flow diagram illustrating a classify_data routine invoked by the classification system in some embodiments.

FIG. 5 is a flow diagram illustrating a classify_data routine invoked by the classification system in some embodiments. The classification system can invoke this routine to classify input, such as by combining temporary classifications provided by multiple SVMs. The routine starts at block 502. At block 504, the routine receives input to be classified. As an example, the routine receives an electronic mail message. At block 506, the routine causes each of the multiple SVMs to produce an output, such as by using the SVM's decision or classification function. At block 508, the routine combines the multiple outputs (e.g., temporary classifications), such as by using a simple majority vote or weighted majority vote. At block 510, the routine classifies the input based on this combined output. At block 512, the routine returns.

Figure 6:
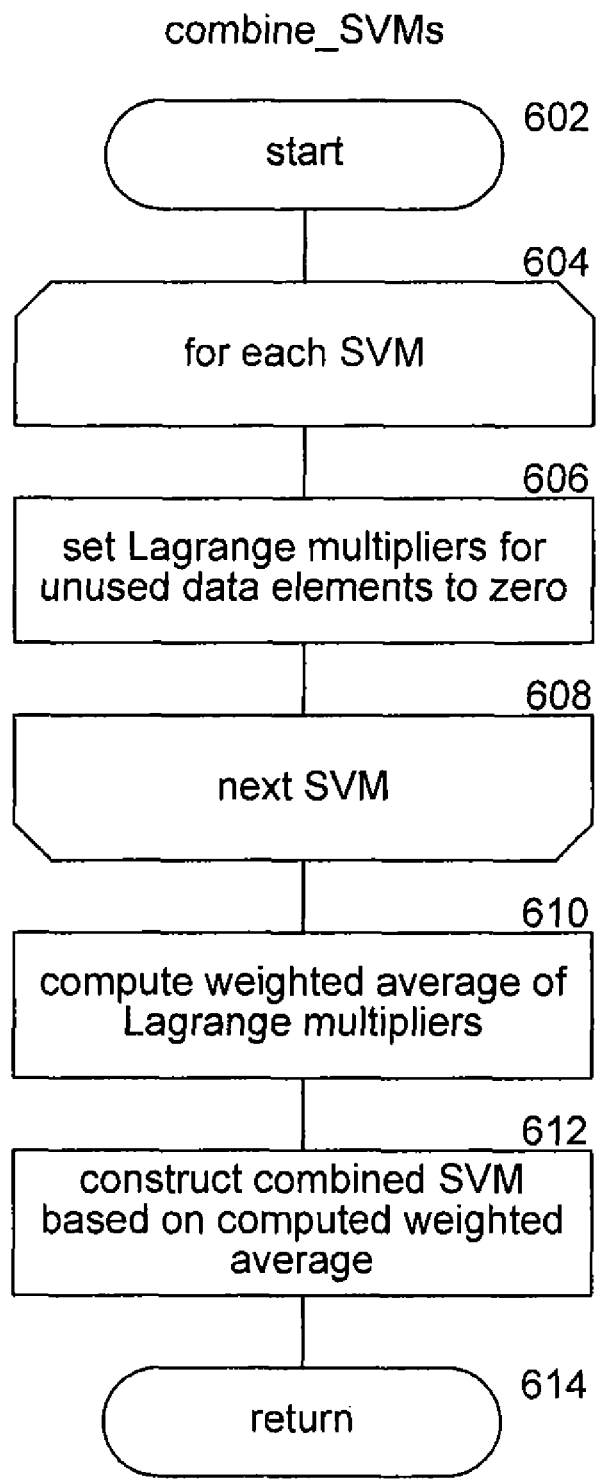
FIG. 6 is a flow diagram illustrating a combine_SVMs routine invoked by the classification system in some embodiments.

FIG. 6 is a flow diagram illustrating a combine_SVMs routine invoked by the classification system in some embodiments. The classification system may invoke this routine to produce a combined SVM. The routine begins at block 602. Between the loop of blocks 604 to 608, the routine processes Lagrange multipliers associated with each SVM constructed based on subsets of training data. At block 604, the routine selects an SVM. At block 606, the routine sets to zero Lagrange multipliers associated with data elements not used to construct the selected SVM. At block 608, the routine selects another SVM. If all SVMs have been processed, the routine continues at block 610. Otherwise, the routine continues at block 606. At block 610, the routine computes the weighted average of the Lagrange multipliers. In some embodiments, the routine may employ the same weights as those employed to calculate a majority vote. At block 612, the routine constructs a combined SVM based on the computed Lagrange multipliers. The classification system can then employ the combined SVM instead of employing each SVM separately and then combining their outputs to classify an input. Because employing SVMs can be computationally expensive, employing a combined SVM can be computationally more efficient. At block 614, the routine returns.

In various embodiments, the classification system may employ classifiers other than SVMs or in combination with SVMs. Examples of other classifiers include discriminant-style classifiers, such as neural networks.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method performed by a computer system for classifying data with a classification system when training data that is used to train the classification system potentially contains errors, comprising:
    dividing by the computer system a full set of the training data into a positive subset and a negative subset, the positive subset containing all training data with a positive classification value and the negative subset containing all training data with a negative classification value;
    creating at least two randomly constructed subsets of the full set of training data wherein there is equal probability any element selected for one of the two randomly constructed subsets will be from the positive and negative subsets further wherein a count of data in each randomly created subset is less than one percent of a count of the full set of training data; and
    creating at least two classifiers, wherein each created classifier is a support vector machine for which multiple expressions in the support vector machine are based on one of the randomly constructed subsets, and each randomly constructed subset is used to create only one classifier.

2. The method of claim 1 further comprising:
    receiving data to be classified;
    causing each of the created classifiers to produce a temporary classification for the received data; and
    combining the temporary classifications produced by the created classifiers to classify the received data as having a positive classification value or a negative classification value.

3. The method of claim 2 wherein the combining includes selecting as the classification of the received data a median of the temporary classifications.

4. The method of claim 2 wherein the combining comprises:
    specifying a weight for each of the created classifiers; and
    computing a weighted average of the temporary classifications based on the specified weights for each of the created classifiers.

5. The method of claim 4 wherein the weight of each of the created classifiers is a margin of a support vector machine.

6. The method of claim 4 wherein the weight of each of the created classifiers is one minus a fraction of points in the randomly constructed subset that is used to create the classifier.

7. The method of claim 4 wherein the weight of each of the created classifiers is an absolute value of a decision function corresponding to the created classifier at the received data.

8. The method of claim 4 wherein the weights are specified when creating the classifiers.

9. A system for resiliently classifying data, comprising:
    a processor and memory;
    a dividing component that divides a full set of training data into a positive subset and a negative subset, the positive subset containing all training data with a positive classification value and the negative subset containing all training data with a negative classification value, and constructs at least two subsets of data randomly selected from the full set of training data wherein each subset contains data selected with a specified probability from the positive and the negative subsets, further wherein a count of data in each constructed subset is less than a count of the full set of training data; and
    at least two support vector machines, each support vector machine based on one of the constructed subsets of the training data.

10. The system of claim 9 further comprising a combining component.

11. The system of claim 10 wherein each of the support vector machines evaluates a received data to produce a temporary classification for the received data and the combining component combines the produced temporary classifications to classify the received data.

12. The system of claim 11 wherein the temporary classifications are combined using a simple majority combination, a weighted majority combination, or by generating a combined support vector machine.

13. The system of claim 9 wherein the count of data in each constructed subset is substantially less than a count of the full set of training data.

14. The system of claim 13 wherein the count of data in each constructed subset is less than one percent of the count of the full set of training data.

15. The system of claim 9 wherein the specified probability is fifty percent.

16. A computer-readable storage medium storing computer-executable instructions that, when executed, cause a computer system to perform a method for resiliently classifying data, the method comprising:
    dividing a portion of training data into a positive subset and a negative subset, the positive subset containing all training data with a positive classification value and the negative subset containing all training data with a negative classification value;
    constructing at least two subsets of the portion of the training data wherein each constructed subset contains data that is randomly selected from both the positive subset and the negative subset, wherein each constructed subset contains data that is randomly selected with equal probability from either the positive subset or the negative subset, and with uniform probability within the positive or negative subsets;
    creating at least two support vector machines for which multiple expressions are based on one of the constructed subsets, and each constructed subset is used to create only one support vector machine;
    combining each of the created support vector machines to create a combined support vector machine wherein the combining includes calculating a weight for each of the created support vector machines that is applied in determining a classification for received data;
    receiving data to be classified; and
    employing the combined support vector machine to classify the received data.

17. The computer-readable medium of claim 16 wherein the portion of the training data includes all of the training data.

* * * * *

UNITED STATES PATENT AND TRADEMARK OFFICE
CERTIFICATE OF CORRECTION

| | | |
|---|---|---|
| PATENT NO. | : 8,364,617 B2 | Page 1 of 1 |
| APPLICATION NO. | : 11/625249 | |
| DATED | : January 29, 2013 | |
| INVENTOR(S) | : Laxman et al. | |

It is certified that error appears in the above-identified patent and that said Letters Patent is hereby corrected as shown below:

In the Specification

Column 1, line 6, after "to" delete "copending".

Signed and Sealed this
Third Day of February, 2015

Michelle K. Lee
*Deputy Director of the United States Patent and Trademark Office*